United States Patent
Iida et al.

(10) Patent No.: US 9,509,025 B2
(45) Date of Patent: Nov. 29, 2016

(54) RECYCLING METHOD AND TREATMENT DEVICE FOR BATTERY PACK

(75) Inventors: Shuji Iida, Toyota (JP); Keiji Shukuya, Nagoya (JP); Mitsuo Shimotori, Inazawa (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 597 days.

(21) Appl. No.: 14/006,626

(22) PCT Filed: Feb. 29, 2012

(86) PCT No.: PCT/IB2012/000368
§ 371 (c)(1),
(2), (4) Date: Sep. 20, 2013

(87) PCT Pub. No.: WO2012/127291
PCT Pub. Date: Sep. 27, 2012

(65) Prior Publication Data
US 2014/0017621 A1    Jan. 16, 2014

(30) Foreign Application Priority Data
Mar. 23, 2011    (JP) .................................. 2011-064589

(51) Int. Cl.

| | |
|---|---|
| H01M 10/54 | (2006.01) |
| C22B 1/00 | (2006.01) |
| C22B 7/00 | (2006.01) |
| C22B 23/00 | (2006.01) |
| C22B 26/12 | (2006.01) |
| H01M 6/52 | (2006.01) |

(52) U.S. Cl.
CPC .............. *H01M 10/54* (2013.01); *C22B 1/005* (2013.01); *C22B 7/007* (2013.01); *C22B 23/00* (2013.01); *C22B 26/12* (2013.01); *H01M 6/52* (2013.01); *Y02P 10/234* (2015.11); *Y02W 30/84* (2015.05)

(58) Field of Classification Search
None
See application file for complete search history.

(56) References Cited

U.S. PATENT DOCUMENTS

| | | | | |
|---|---|---|---|---|
| 5,437,705 | A | * | 8/1995 | DeLisle ................ H01M 6/52 266/148 |
| 2008/0050295 | A1 | | 2/2008 | Uchida et al. |
| 2009/0314134 | A1 | | 12/2009 | Iida |

FOREIGN PATENT DOCUMENTS

| | | |
|---|---|---|
| CN | 100530813 | 8/2009 |
| EP | 1 760 821 A1 | 3/2007 |
| JP | 9-213379 | 8/1997 |
| JP | 2001-283871 | 10/2001 |

(Continued)

OTHER PUBLICATIONS

Ishiwatari et al. JP 2001-283871, machine translation (Oct. 2001).*

*Primary Examiner* — Carlos Barcena
*Assistant Examiner* — Wojciech Haske
(74) *Attorney, Agent, or Firm* — Finnegan, Henderson, Farabow, Garrett & Dunner, LLP

(57) ABSTRACT

A method of recycling a battery pack (10) that includes an assembled battery composed of a plurality of electric cells that are connected in series to one another includes a heating process of heating the battery pack (10) by supplying a vapor supplied from a vapor boiler (14) into a heat treatment bath (12) for heating the battery pack (10) to replace a space in the heat treatment bath (12) with the vapor, and a condensation process of condensing thermolysis products, which are discharged from the battery pack (10) through the heating process, by a condenser (18).

5 Claims, 6 Drawing Sheets

(56) References Cited

FOREIGN PATENT DOCUMENTS

| | | |
|---|---|---|
| JP | 2004-339572 | 12/2004 |
| JP | 2004-342524 | 12/2004 |
| JP | 2005-26088 | 1/2005 |
| JP | 2005-113226 | 4/2005 |
| JP | 2005-197149 | 7/2005 |
| JP | 2010-3512 | 1/2010 |
| JP | 2010-108864 | 5/2010 |
| JP | 2010-165569 | 7/2010 |
| KR | 10-0832900 | 3/2007 |

* cited by examiner

RECYCLING METHOD AND TREATMENT DEVICE FOR BATTERY PACK

CROSS-REFERENCE TO RELATED APPLICATIONS

This application is a national phase application of International Application No. PCT/IB2012/000368, filed Feb. 29, 2012, and claims the priority of Japanese Application No. 2011-064589, filed Mar. 23, 2011, the content of both of which is incorporated herein by reference.

BACKGROUND OF THE INVENTION

1. Field of the Invention

The invention relates to a recycling method and a treatment device for a battery pack, and more specifically, to a recycling method and a treatment device for a battery pack that make it possible to safely perform an operation of recycling the battery pack.

2. Description of Related Art

In general, a battery pack is composed of an assembled battery, which is constituted by connecting in series a plurality of (e.g., about 10) battery modules, each of which is a single component unit obtained by connecting in series a plurality of (e.g., about 6 or 8) battery cells of a secondary battery such as a nickel hydrate secondary battery, a lithium-ion secondary battery, or the like to one another, to one another, electronic components such as a control unit that monitors and controls a charge state of the battery modules, a relay for disconnecting an electric circuit, a safety plug for mechanically cutting off the circuit, a cooling blower that cools the assembled battery, and the like, signal lines and power lines that connect the respective components to one another, a case that accommodates them in a sealed manner, and the like.

In the case where such a battery pack is used as, for example, a component for a vehicle such as a hybrid vehicle or the like, when the vehicle is scrapped, the battery pack is removed from the vehicle. After an operation of dismantling the battery pack and sorting the battery cells from the other components is performed, useful metals are recovered from the battery cells.

In general, a battery pack used as an automobile component generates a high voltage (e.g., a voltage equal to or higher than 300 V). Even when the vehicle is scrapped and the battery pack is removed therefrom, the battery pack is often held at the high voltage. In general, the operation of dismantling the battery pack and sorting the battery cells from the other components is manually performed by an operator who wears protective equipment such as insulated gloves or the like. Therefore, the securement of operational safety needs to be sufficiently taken into account.

Further, with a view to enhancing the safety in performing the operation of dismantling the battery pack and the like, it is also conceivable to discharge the assembled battery in the battery pack. In this case, however, the battery pack needs to be stored for a long time for self-discharge or to be forcibly discharged through the use of a resistor or the like. Consequently, the operation of recycling the battery pack takes a long time or becomes troublesome.

Thus, from the standpoint of ensuring the safety in performing the recycling operation and reducing the time required for the recycling operation, it is desirable that the assembled battery in the battery pack be swiftly and safely insulated (0 V).

Further, as an electrolytic solution in the battery cells, a burnable organic electrolyte is used in the case of a lithium-ion secondary battery, and a water-soluble electrolyte is used in the case of a nickel hydride secondary battery or the like. In performing the recycling operation, the recycling of the battery pack can be substantially facilitated by efficiently removing the electrolytic solution in the battery cells.

SUMMARY OF THE INVENTION

The invention provides a recycling method and a treatment device for a battery pack that can make an improvement in at least one of the securement of safety in performing a recycling operation, the shortening of time, and the facilitation of the recycling of the battery pack.

A first aspect of the invention relates to a recycling method for a battery pack that includes an assembled battery composed of a plurality of electric cells that are connected in series to one another. This recycling method includes supplying a replacement gas, which replaces a space in a heat treatment bath for heating the battery pack, into the heat treatment bath to heat the battery pack, and condensing thermolysis products discharged from the battery pack by heating the battery pack. The replacement gas is a vapor or an inert gas.

The battery pack may be heated to a temperature equal to or higher than 160° C.

The recycling method may further include heating the vapor before the vapor is supplied into the heat treatment bath. The heated vapor may be supplied into the heat treatment bath to heat the battery pack.

A second aspect of the invention relates to a treatment device for recycling a battery pack that includes an assembled battery composed of a plurality of electric cells that are connected in series to one another. This treatment device is equipped with a heat treatment bath for heating the battery pack, a supply unit that supplies a replacement gas, which replaces a space in the heat treatment bath, into the heat treatment bath, and a condensation unit that condenses thermolysis products discharged from the heated battery pack. The replacement gas is a vapor or an inert gas.

In the treatment device, the battery pack may be heated to a temperature equal to or higher than 160° C. in the heat treatment bath.

The treatment device may further be equipped with a heating unit that heats the vapor before the vapor is supplied into the heat treatment bath. The heated vapor may be supplied into the heat treatment bath.

The invention can make an improvement in at least one of the securement of safety in performing a recycling operation, the shortening of time, and the facilitation of the recycling of the battery pack.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

A battery pack in this embodiment of the invention is composed of an assembled battery, which is constituted by connecting in series a plurality of (e.g., about 10) battery modules, each of which is a single component unit obtained by connecting in series a plurality of (e.g., about 6 or 8) battery cells of a secondary battery such as a nickel hydrate secondary battery, a lithium-ion secondary battery, or the like to one another, to one another, electronic components such as a control unit that monitors and controls a charge state of the battery modules, a relay for disconnecting an electric circuit, a safety plug for mechanically cutting off the circuit, a cooling blower that cools the assembled battery, and the like, signal lines and power lines that connect the respective components to one another, a case that accommodates them in a sealed manner, and the like.

In the recycling method for the battery pack according to this embodiment of the invention, a replacement gas (a water vapor or an inert gas) that replaces a space in a heat treatment bath for heating the battery pack is supplied into the heat treatment bath, and a heating process of heating the battery pack and a condensation process of condensing thermolysis products discharged from the battery pack are carried out. Owing to these processes, an electrolytic solution in the battery cells is recovered, and the battery function of the battery cells is lost. Then, the battery pack whose battery function has been lost is dismantled, and valuable resources in the battery cells are recovered. The heating process and the condensation process will be described hereinafter, using a treatment device shown in FIG. 1.

Figure 1:
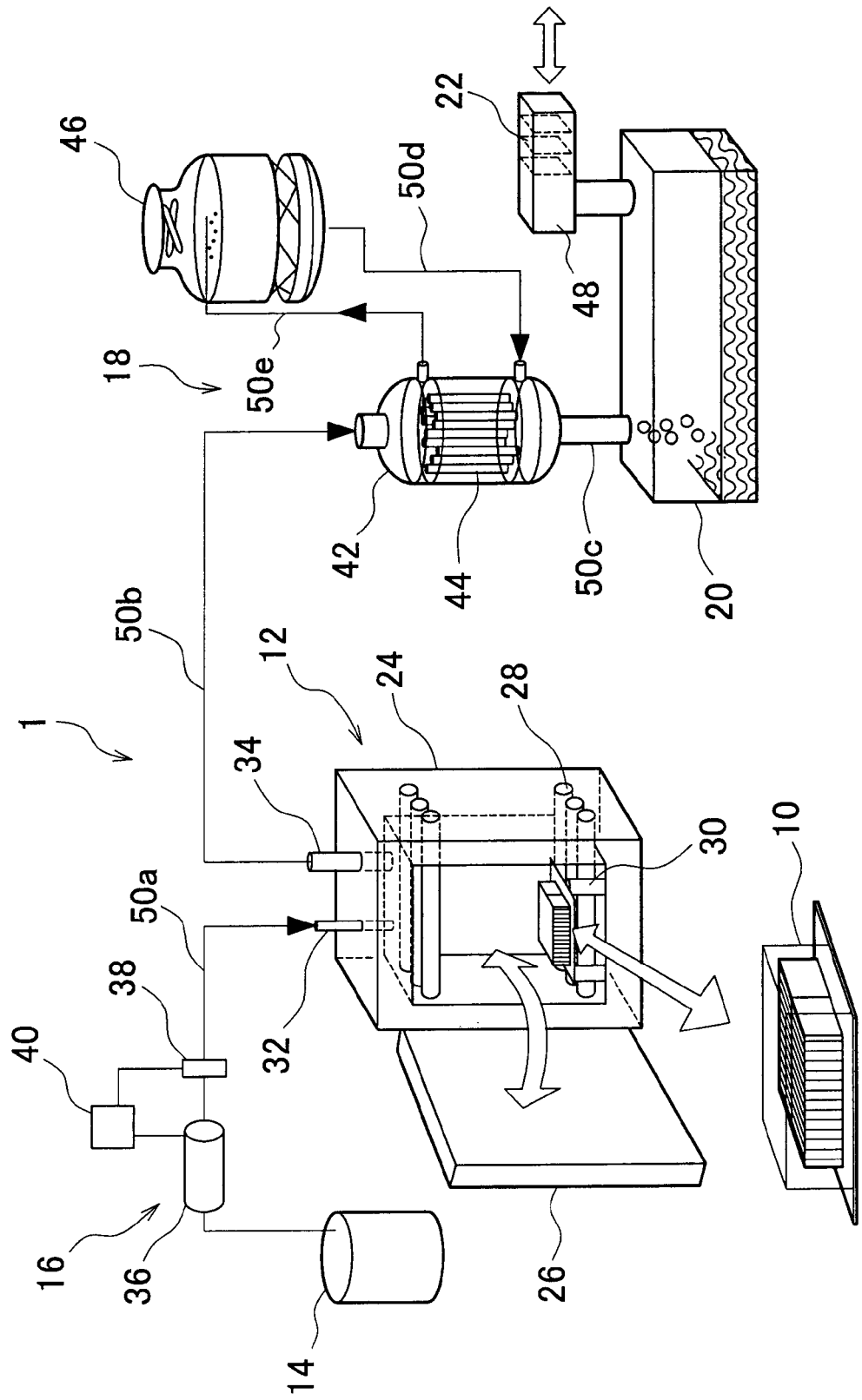
FIG. 1 is a schematic diagram showing an example of a treatment device that recycles a battery pack according to this embodiment of the invention.

FIG. 1 is a schematic diagram showing an example of a treatment device that recycles a battery pack according to this embodiment of the invention. A treatment device 1 shown in FIG. 1 is mainly used for a heating process and a condensation process in the aforementioned recycling method for a battery pack 10.

The treatment device 1 shown in FIG. 1 is equipped with a heat treatment bath 12, a vapor boiler 14, a vapor heater 16, a condenser 18, a waste liquid tank 20, a gas adsorption filter 22, and piping elements.

The heat treatment bath 12 is a treatment bath for mainly subjecting the battery pack 10 to a heat treatment. In this embodiment of the invention, the heat treatment bath 12 is equipped with a box body portion 24 that accommodates the battery pack 10, an open/close door 26 that opens or seals the box body portion 24, electric heaters 28 that are provided in upper and lower portions in the box body portion 24 respectively, and a pedestal 30 on which the battery pack 10 is laid. The box body portion 24 is provided with a supply pipe 32 for supplying a vapor (or a later-described inert gas) into the box body portion 24, and a discharge pipe 34 through which gases in the box body portion 24, such as a vapor and the like, are discharged. Further, the heat source is not limited to the electric heaters 28. An indirect heating-type gas heater, such as a radiant tube or the like, or the like may also be employed as a heat source.

The vapor boiler 14 generates the water vapor (hereinafter referred to simply as a vapor), and is designed as, for example, a through flow boiler or the like. The vapor heater 16 heats the vapor generated by the vapor boiler 14. In this embodiment of the invention, the vapor heater 16 is equipped with an electric heater 36, a temperature sensor 38, and a temperature adjuster 40.

As will be described later, the condenser 18 is a device for condensing thermolysis products and the like discharged mainly from the battery pack 10. Mentionable as the condenser 18 are an indirect-type water-cooled heat exchanger of a shell-and-tube type or the like, a surface-type heat exchanger of a plate-fin type or the like, and the like. The condenser 18 of this embodiment of the invention is designed as the shell-and-tube type, and is equipped with a main body portion 42, a plurality of heat transfer pipes 44 provided in the main body portion 42, a cooling tower 46, and piping elements that connect the heat transfer pipes 44 in the main body portion 42 to the cooling tower 46.

The waste liquid tank 20 is provided with a vent pipe 48. Further, the gas adsorption filter 22 is installed in the vent pipe 48, and the vent pipe 48 is opened to the atmosphere via the gas adsorption filter 22. Mentionable as the gas adsorption filter 22 are an activated carbon filter and the like. The treatment device 1 of this embodiment of the invention is an atmosphere opening system, and is structured as follows. For example, when the device is in operation, the interior of the device is filled with the vapor at one atmospheric pressure. However, while the vapor is liquefied due to a fall in its temperature resulting from the stoppage of the device, air is introduced from the gas adsorption filter 22 to maintain the atmospheric pressure. Thus, the opening/closing of the open/close door 26 of the heat treatment bath 12 and the like can be easily and safely carried out.

Next, the piping elements will be described. One end of a piping element 50a is connected to the vapor boiler 14, and the other end of the piping element 50a is connected to the supply pipe 32 of the heat treatment bath 12 via the vapor heater 16. One end of a piping element 50b is connected to the discharge pipe 34 of the heat treatment bath 12, and the other end of the piping element 50b is connected to an introduction port (not shown) of the main body portion 42 of the condenser 18. One end of a piping element 50c is connected to a discharge port (not shown) of the main body portion 42 of the condenser 18, and the other end of the piping element 50c is connected to a waste liquid inlet (not shown) of the waste liquid tank 20. One end of a piping element 50d is connected to a coolant outlet (not shown) of the cooling tower 46, and the other end of the piping element 50d is connected to a heat transfer pipe inlet (not shown) in the main body portion 42. One end of a piping element 50e is connected to a heat transfer pipe outlet in the main body portion 42, and the other end of the piping element 50e is connected to a coolant inlet of the cooling tower 46.

Next, the operation of the treatment device 1 according to this embodiment of the invention will be described.

⟨Heating Process⟩

First of all, the open/close door 26 of the heat treatment bath 12 is opened, the battery pack 10 is set on the pedestal 30 in the box body portion 24, and the open/close door 26 is closed and sealed. Then, the vapor boiler 14 is operated to generate the vapor, and the vapor is further heated by the vapor heater 16 in the piping element 50a. The heated vapor is supplied into the box body portion 24, and an electric heater 28 of the heat treatment bath 12 is turned on to heat the battery pack 10 (a heating process). In supplying the heated vapor, with a view to preventing dew condensation in the box body portion 24, it is desirable to preheat the interior of the box body portion 24 and the battery pack 10 (e.g., to about 80° C.) prior to the supply of the heated vapor. Further, the heating of the vapor by the vapor heater 16 is preferable in that the battery pack 10 can be heated earlier, but the heating of the vapor is not indispensable. It should be noted that the temperature control of the heated vapor is performed by detecting a temperature of the heated vapor by the temperature sensor 38, and adjusting the output of the electric motor 36 by the temperature adjuster 40 on the basis of the detected temperature.

The temperature to which the battery pack 10 is heated differs depending on the type of the battery cells. However, the pressure in the battery cells rises through the heating of the battery pack 10 at a temperature equal to or higher than a boiling point of an electrolytic solution in the battery cells, so that thermolysis products such as the electrolytic solution and the like can be easily discharged as gases to the outside of the battery cells from safety valves provided on the battery cells. In a lithium-ion secondary battery that employs an organic electrolytic solution and a nickel hydride secondary battery that employs an aqueous electrolytic solution, the battery pack 10 is heated at a temperature equal to or higher than 150° C., so that it is possible to destroy the battery function and make the voltage equal to zero without disassembling the battery pack 10.

In the heating process of this embodiment of the invention, the space (gas) in the heat treatment bath 12 is replaced with the heated vapor (the space in the heat treatment bath 12 is filled with the heated vapor), and hence is in an anoxic state. Accordingly, among electrolytic solutions used in a lithium-ion secondary battery, organic electrolytes such as dimethyl carbonate and the like are burnable materials, but even when an organic electrolyte is discharged to the outside of the battery cells through the heat treatment, this organic electrolyte is discharged from the interior of the heat treatment bath 12 without burning in the heat treatment bath 12. Further, among electrolyte solutions used in a lithium-ion secondary battery, electrolyte salts such as lithium hexafluorophosphate and the like are changed through thermolysis into lithium fluoride, hydrogen fluoride, and the like, by the heat treatment. Especially by being heated at a temperature equal to or higher than 160° C., lithium fluoride is fixed to (can be caused to remain in) the interior of the battery cells, such as electrode plates or the like, so that the amount of the lithium fluoride flowing out from the battery cells can be substantially reduced.

Further, in the heating process of this embodiment of the invention, it is possible to mention, as an advantage of supplying the vapor, that hydrogen fluoride (gas) can be easily recovered as fluorinated acid in a subsequent condensation process. It should be noted that the details of changes in the voltage of the lithium-ion secondary battery and a reaction in the lithium-ion secondary battery during the heat treatment will be described later.

It should be noted that by subjecting a nickel hydride secondary battery to the heating process of this embodiment of the invention as well in a similar manner, an electrolytic solution used in the nickel hydride secondary battery, such as an aqueous solution of potassium hydroxide or the like, evaporates, and is discharged from the safety valves provided on the battery cells.

⟨Condensation Process⟩

Then, the organic electrolyte discharged from the battery cells through the heating process, the electrolytic solution such as lithium hexafluorophosphate or the like, a thermoplastic resin, which is a resinous material used as a material constituting the battery pack 10, and the like are discharged from the discharge pipe 34 of the heat treatment bath 12 and supplied to the main body portion 42 of the condenser 18 through the piping element 50b, in the form of thermolysis products (gases). In this case, a coolant in the cooling tower 46 is supplied to the heat transfer pipes 44 through the piping element 50d. After the main body portion 42 is cooled, the coolant is discharged from the piping element 50e, and is returned to the cooling tower 46 again. Thus, the thermolysis products supplied to the main body portion 42 of the condenser 18 is cooled and liquefied (a condensation process). A condensate liquid (thermolysis products) liquefied by the condenser 18 is a mixture of an aqueous waste liquid of vapor and the like and an organic waste liquid of an organic electrolyte and resins and the like in the battery pack 10. Hydrogen fluoride, which is generated through thermal decomposition of the aforementioned electrolytic salt, dissolves into the aqueous waste liquid to become fluorinated acid. It is desirable that the temperature of the coolant supplied to the main body portion 42 be set to a temperature that allows the temperature in the main body portion 42 to fall to or below the boiling point of the thermolysis products through cooling. In the case of a lithium-ion secondary battery, it is preferable to set the temperature of the coolant equal to or lower than 32° C. Thus, the thermolysis products can be efficiently cooled and liquefied.

Then, the condensate liquid liquefied by the condenser 18 passes through the piping element 50c to be trapped in the waste liquid tank 20. The condensate liquid in the waste liquid tank 20 is likely to be acidic due to the influence of fluorinated acid or the like. Therefore, when a certain amount of condensate liquid accumulates in the waste liquid tank 20, it is desirable to add alkaline chemicals such as calcium hydroxide and the like to the condensate liquid to make an adjustment to an appropriate pH. Thus, the entire waste liquid tank 20 can be transported to treatment facilities or the like to perform a treatment. It should be noted that a drainage treatment device may be separately installed to perform the treatment.

When the pressure in the waste liquid tank 20 becomes higher than the atmospheric pressure, gas is discharged into the atmosphere from the vent pipe 48, which is installed in the waste liquid tank 20. At this moment, an organic electrolyte and the like are contained in the gas in some cases. However, the organic electrolyte and the like are adsorbed by an activated carbon filter (the gas adsorption filter 22), so that odor and the like do not leak out from the device. Further, as described above, during a process in which the vapor in the device liquefy due to a fall in the temperature thereof, for example, when the device is stopped, the pressure in the waste liquid tank 20 becomes lower than the atmospheric pressure in some cases. However, since outside air enters the waste liquid tank 20 from the vent pipe 48 via the activated carbon filter, the pressure in the device is held at the atmospheric pressure.

Hereinafter, changes in the heating temperature and the voltage of the lithium-ion secondary battery in the heating process and the reaction in the lithium-ion secondary battery during the heating process will be described.

Figure 2:
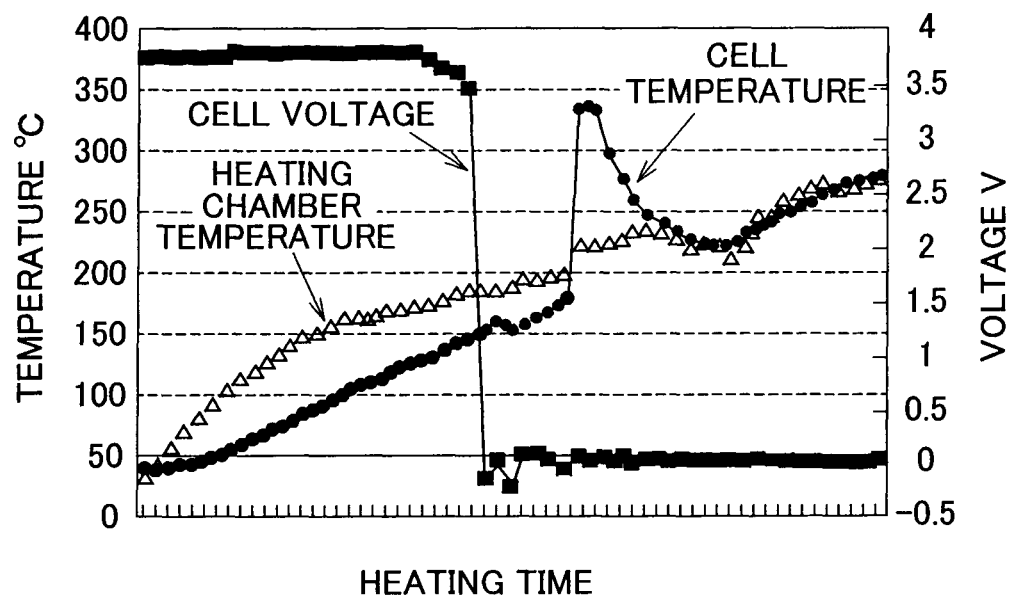
FIG. 2 is a diagram showing an example of a result obtained by measuring a voltage while heating a lithium-ion secondary battery (battery cells)

FIG. 2 is a diagram showing an example of a result obtained by measuring a voltage while heating a lithium-ion secondary battery (battery cells). As shown in FIG. 2, around 150° C., the organic electrolyte and the like are discharged from the safety valve of the lithium-ion secondary battery, and the voltage of the lithium-ion secondary battery starts fluctuating. In addition, as heating is continued, the temperature abruptly rises around 180° C., white smoke is discharged from the safety valve, and the voltage becomes equal to zero, so that it is possible to completely destroy the function of the battery. In addition to the occurrence of a chemical reaction such as the bonding of lithium atoms entered into a negative electrode material during charging to fluorine in the electrolyte, or the like, a thermal decomposition reaction of a positive electrode material occurs. Such an abrupt rise in temperature is considered to take place for this reason. After the heating process as described above, the battery pack 10 can be safely handled as a scrap whose voltage is 0. Therefore, the dismantling of the battery pack 10 and the like as subsequent processes can be safely and easily carried out.

Figure 3:
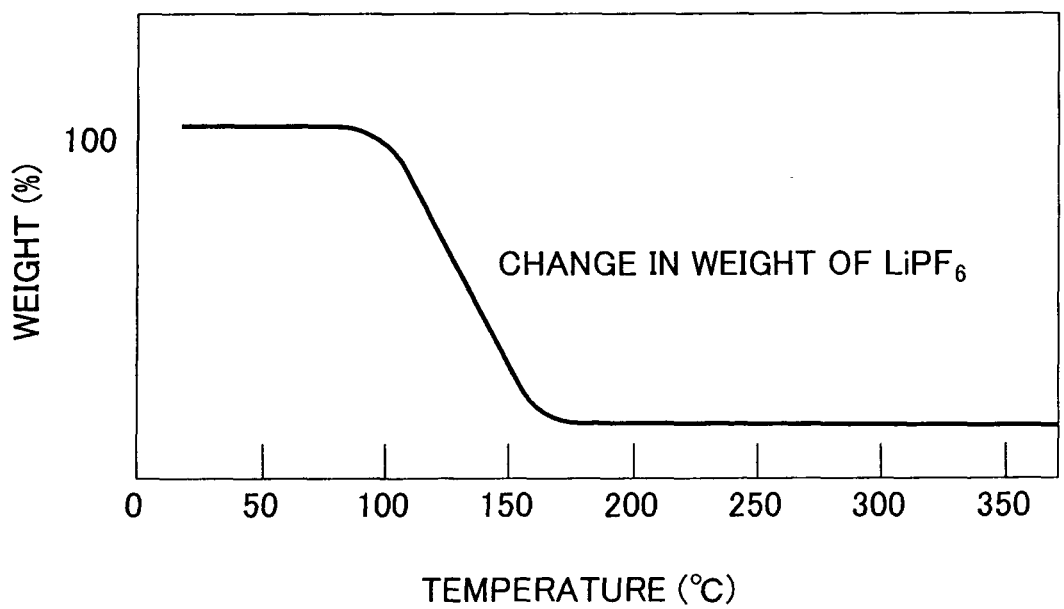
FIG. 3 is a diagram showing thermal decomposition properties of lithium hexafluorophosphate ($LiPF_6$)

FIG. 3 is a diagram showing thermal decomposition properties of lithium hexafluorophosphate ($LiPF_6$). As shown in FIG. 3, lithium hexafluorophosphate, which is used as an electrolytic salt for a lithium-ion secondary battery, is thermally decomposed by being heated to about 150° C. In particular, by being heated at a temperature equal to or higher than 160° C., lithium hexafluorophosphate is thermally decomposed and fixed in the battery cells as lithium fluoride, and a part of unreacted fluorinated acid is discharged to the outside of the battery cells together with the organic electrolyte.

Further, dimethyl carbonate, which is used as an organic electrolyte for a lithium-ion secondary battery, has a boiling point of 90° C. Therefore, by heating the battery cells to a temperature equal to or higher than 90° C., dimethyl carbonate evaporates in the battery cells. In addition, by heating the battery cells to a temperature equal to or higher than 150° C., the pressure in the battery cells rises, thermal decomposition products are discharged from the safety valves to the outside of the battery cells, and the function of the battery is destroyed.

Figure 4:
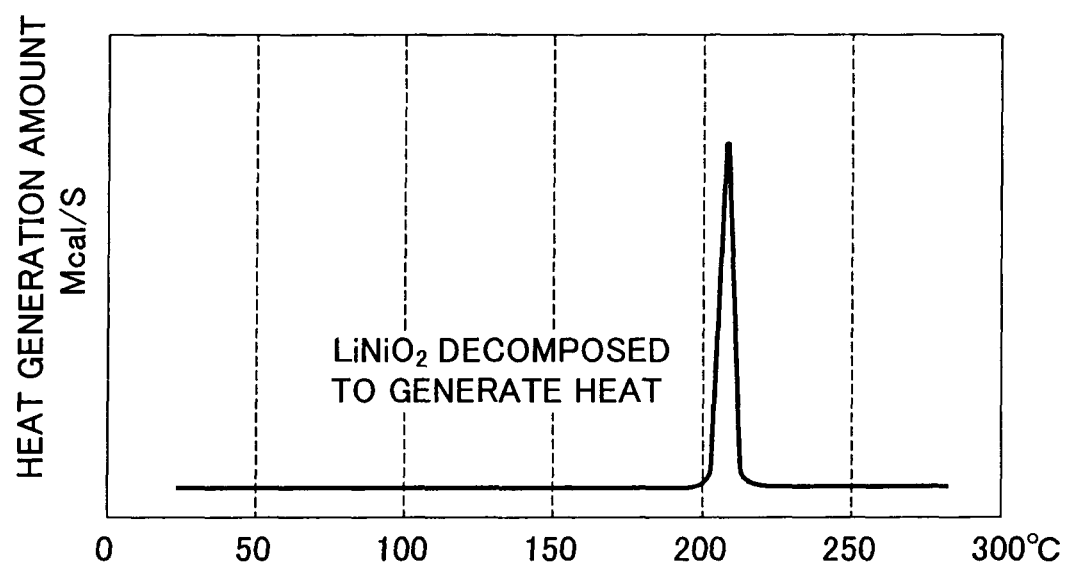
FIG. 4 is a diagram showing thermal decomposition properties of lithium nickel oxide ($LiNiO_2$)

FIG. 4 is a diagram showing thermal decomposition properties of lithium nickel oxide ($LiNiO_2$). As shown in FIG. 4, lithium nickel dioxide, which is used as a positive electrode material for a lithium-ion secondary battery, is decomposed around 210° C. with an abrupt exothermic reaction. Besides, lithium cobalt oxide, lithium manganese oxide, or the like is used as the positive electrode material for the lithium-ion secondary battery. These materials are thermally decomposed at about 180 to 350° C. Accordingly, in order to cause the electrolytic solution to be discharged from the battery pack 10, recover the electrolytic solution, and easily recover the positive electrode material such as lithium nickel dioxide or the like, it is desirable to heat the battery pack at a temperature at which the organic electrolyte is discharged and a positive electrode active material is not decomposed, namely, at a temperature equal to or higher than 150° C. and lower than 180° C.

Figure 5:
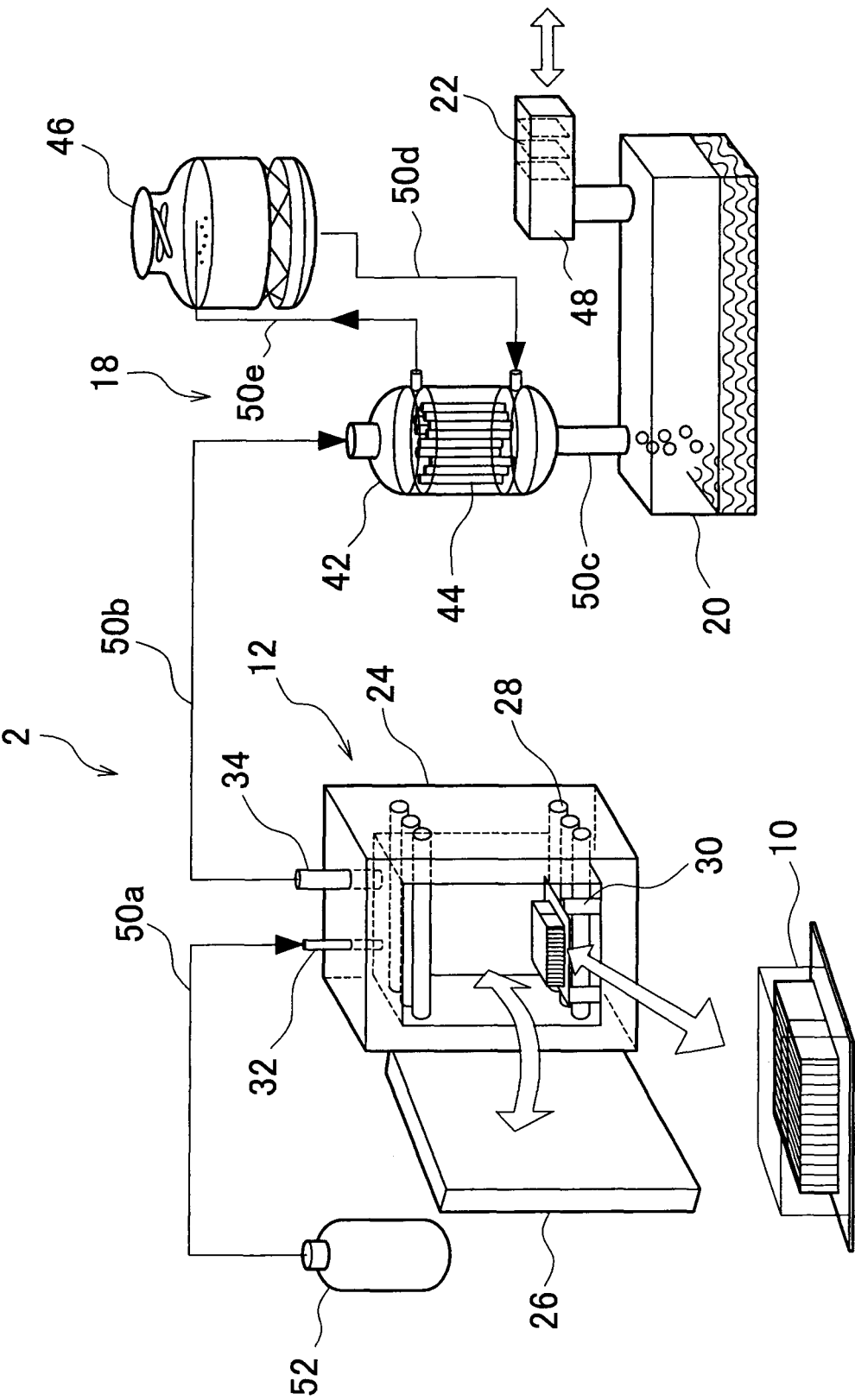
FIG. 5 is a schematic diagram showing another example of the treatment device that recycles the battery pack according to this embodiment of the invention.

FIG. 5 is a schematic diagram showing another example of the treatment device that recycles the battery pack according to this embodiment of the invention. In a treatment device 2 shown in FIG. 5, components identical in configuration to those of the treatment device 1 shown in FIG. 1 are denoted by the same reference symbols respectively, and the description thereof will be omitted.

The treatment device 2 shown in FIG. 5 is equipped with the heat treatment bath 12, an inert gas generation device 52, the condenser 18, the waste liquid tank 20, the gas adsorption filter 22, and piping elements.

The inert gas generation device 52 is a gas cylinder or the like that is filled with an inert gas such as nitrogen gas, argon gas, or the like. It should be noted that although the inert gas is supplied to the heat treatment bath 12 without being heated in this embodiment of the invention, it is also acceptable to heat the inert gas as described above.

The waste liquid tank 20 is provided with the vent pipe 48. The gas adsorption filter 22 is installed in the vent pipe 48, and the vent pipe 48 is opened to the atmosphere via the gas adsorption filter 22. The gas adsorption filter 22 includes an alkaline chemical filter and an activated carbon filter. The alkaline chemical filter is formed by, for example, causing a filter formed of a chemical fiber or the like to adsorb calcium hydroxide powder or sandwiching calcium hydroxide powder between two filters.

In this embodiment of the invention, the inert gas is supplied into the box body portion 24 of the heat treatment bath 12 via the piping element 50a, by the gas cylinder that is filled with the inert gas, and the electric heater 28 of the heat treatment bath 12 is turned on to heat the battery pack 10 (the heating process). The space (gas) in the heat treatment bath 12 is replaced with the inert gas (the space in the heat treatment bath 12 is filled with the inert gas), and is in an anoxic state. Therefore, as described above, even when the organic electrolyte is discharged to the outside of the battery cells through the heat treatment, the organic electrolyte is discharged from the interior of the heat treatment bath 12 instead of burning in the heat treatment bath 12. Further, lithium hexafluorophosphate changes into lithium fluoride, hydrogen fluoride, and the like through thermolysis. Lithium fluoride, hydrogen fluoride, and the like are partially fixed to the interior of the battery cells such as the electrode plates or the like, and the rest is discharged from the interior of the heat treatment bath 12. Further, thermoplastic resin, which is a resinous material used for the battery pack 10, and the like are also discharged from the interior of the heat treatment bath 12.

The thermolysis decomposition products such as the organic electrolyte discharged from the battery cells through the heating process, lithium hexafluorophosphate, thermoplastic resin, which is a resinous material used as a material constituting the battery pack 10, and the like are liquefied by the condenser 18. However, in the case where the inert gas is supplied in the heating process, since the condensate liquid liquefied by the condenser 18 is mostly made up of an organic waste liquid, hydrogen fluoride is unlikely to dissolve to become fluorinated acid. Thus, hydrogen fluoride is collected as calcium fluoride by calcium hydroxide in the alkaline chemical filter installed in the waste liquid tank 20, or is recovered by being adsorbed by the activated carbon filter.

Figure 6:
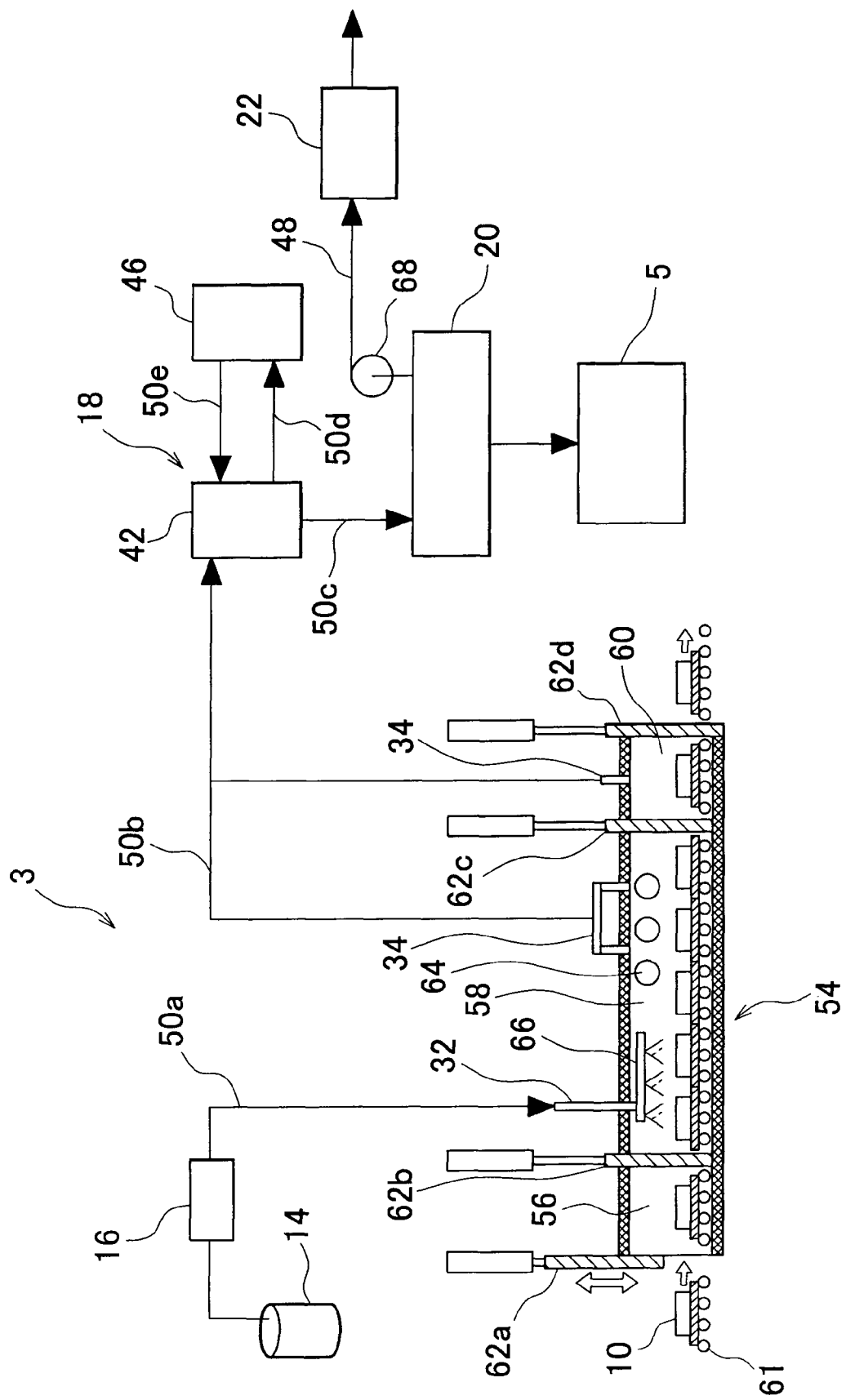
FIG. 6 is a schematic diagram showing still another example of the treatment device that recycles the battery pack according to this embodiment of the invention.

FIG. 6 is a schematic diagram showing still another example of the treatment device that recycles the battery pack according to this embodiment of the invention. A treatment device 3 shown in FIG. 6 is designed to make it possible to successively treat the battery pack 10. In the treatment device 3 shown in FIG. 6, components identical in configuration to those of the treatment device 1 shown in FIG. 1 are denoted by the same reference symbols respectively, and the description thereof will be omitted.

A heat treatment bath 54 has a spare chamber 56, a heating chamber 58 (which can be regarded as the heat treatment bath of the invention), and a retention chamber 60. One or a plurality of battery packs 10 are conveyed to the spare chamber 56, the heating chamber 58, and the retention chamber 60 by a roller conveyor 61 at a time. The spare chamber 56, the heating chamber 58, and the retention chamber 60 are sealed or opened by open/close doors (62a, 62b, 62c, and 62d) respectively. A radiant tube 64 as an indirect heating-type gas heater is installed in the heating chamber 58. Further, the heating chamber 58 is provided with a supply pipe 32 for supplying a vapor (or an inert gas) into the heating chamber 58, and the supply pipe 32 is provided with a nozzle for diffusing the vapor. Further, each of the heating chamber 58 and the retention chamber 60 is provided with the discharge pipe 34 through which gases in each of the chambers, such as a vapor and the like, are discharged.

In the treatment device 3 of this embodiment of the invention, first of all, the open/close door 62a assumes an open state, and the battery pack 10 is conveyed into the spare chamber 56 by the roller conveyer 61. Then, the open/close door 62a assumes a closed state, the open/close door 62b assumes an open state, and the battery pack 10 is conveyed into the heating chamber 58 by the roller conveyer 61. In the heating chamber 58, with the open/close door 62b closed, vapor generated by operating the vapor boiler 14 (which are further heated by the vapor heater 16 in the piping element 50a) are supplied from the nozzle 66 of the supply pipe 32 into the heating chamber 58, and the battery pack 10 is heated by the radiant tube 64 in the heating chamber 58 (the heating process). As described above, through the heating process of the battery pack 10, thermolysis decomposition products are discharged from the battery pack 10, and the function of the battery is destroyed without disassembling the battery pack 10. Then, the open/close door 62c assumes an open state, and the battery pack 10 is conveyed into the retention chamber 60 by the roller conveyer 61. It should be noted that thermolysis decomposition products may be discharged from the battery pack 10 in the retention chamber 60 by the residual heat resulting from the heating in the heating chamber 58. Then, the open/close door 62c and the open/close door 62d are caused to assume a closed state and an open state respectively, and the battery pack 10, whose battery function is destroyed, is taken out from the heat treatment bath 54.

The thermolysis products discharged from the battery pack 10 are discharged from the discharge pipes 34 of the retention chamber 60 and the heating chamber 58, and are supplied to the main body portion 42 of the condenser 18 through the piping element 50b. In this case, the main body portion 42 is cooled by the coolant supplied from the cooling tower 46, so that the thermolysis products supplied to the main body portion 42 are cooled and liquefied (the condensation process). The condensate liquid liquefied by the condenser 18 is stored into the waste liquid tank 20 through the piping element 50c.

In this embodiment of the invention, it is desirable to install a fan 68 in the vent pipe 48 of the waste liquid tank 20, hold the waste liquid tank 20 at a negative pressure by the fan 68, and hold each of the piping elements (50b and 50c), the heating chamber 58, and the retention chamber 60 at a negative pressure via the waste liquid tank 20, thereby preventing the thermolysis products from flowing out from the treatment device 3. Further, the thermal decomposition products that cannot be sufficiently condensed by the condenser 18 are subjected to an adsorption treatment by the gas adsorption filter 22 (an activated carbon filter or the like) that is provided in the vent pipe 48. The condensate liquid in the waste liquid tank 20 is transported to an incineration treatment device 5 to be subjected to an incineration treatment. It should be noted that the condensate liquid may be treated by being separately subjected to an industrial waste disposal treatment.

Owing to the heating process and the condensation process as described above, the function of the battery is destroyed. The battery pack whose electrolytic solution in the battery cells has been discharged is conveyed to processes of dismantling the battery pack and recovering valuable resources in the battery cells.

Further, in the heating process and the condensation process, since the battery pack, which is composed of electronic components, signal lines, power lines, a case and the like as well as the battery cells, is treated, the treated battery pack assumes a mixed state in which metal components are entangled with molten resin. However, the battery function of the battery pack has been destroyed, and the electrolytic solution in the battery cells has been discharged. Therefore, as will be described later, all the processes from the dismantlement of the battery pack to the recovery of valuable resources in the battery cells can be automated by a machine while making it unnecessary for an operator to perform a troublesome manual operation (an operation of dismantling the battery pack). As a result, the battery pack can be recycled safely and at a low price.

Figure 7:
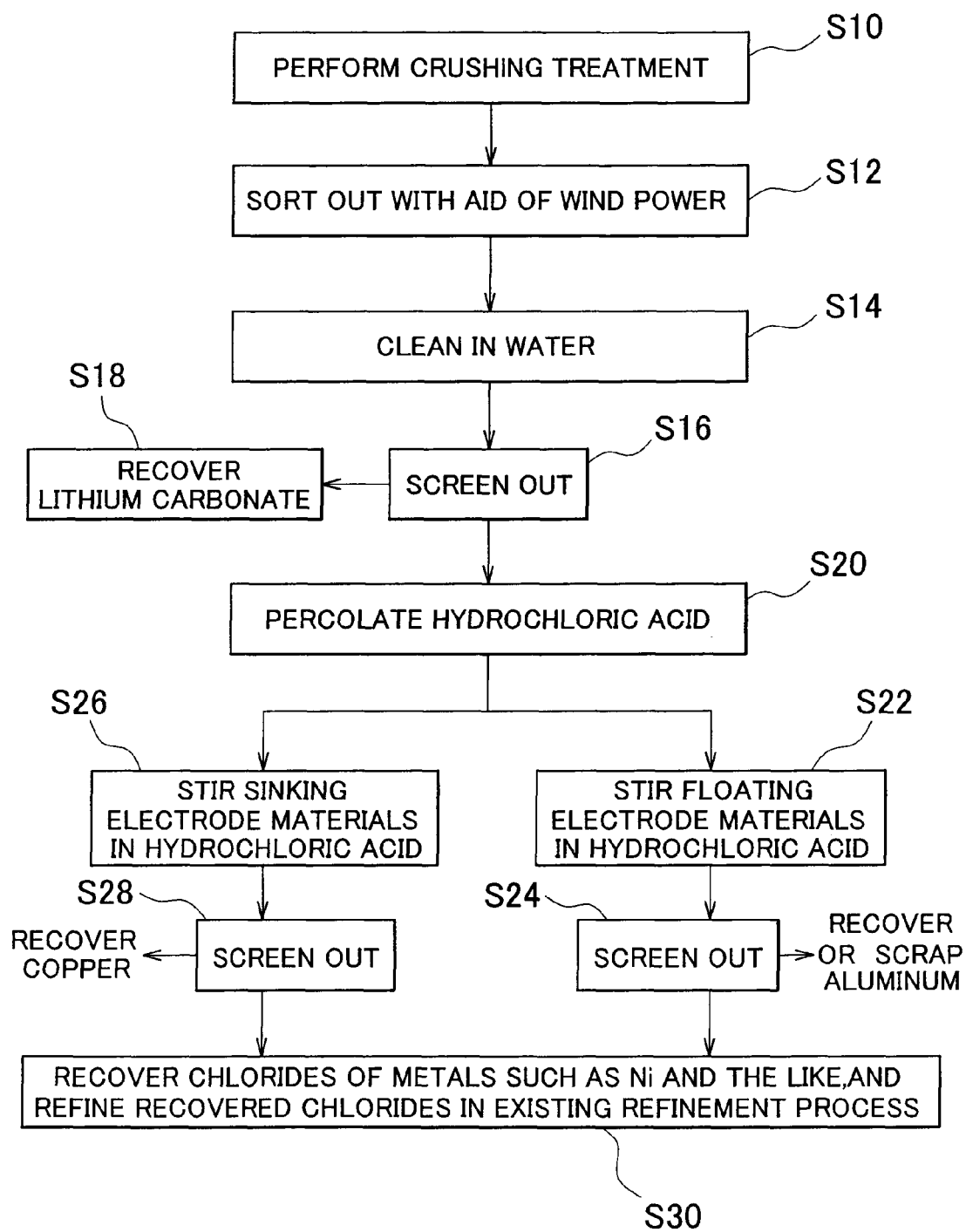
FIG. 7 is a flowchart for explaining a process of dismantling the battery back and a process of recovering valuable resources in the battery cells.

FIG. 7 is a flowchart for explaining a process of dismantling the battery back and a process of recovering valuable resources in the battery cells. Although an example of a lithium-ion secondary battery will now be described, the invention can be likewise applied to a nickel hydrate secondary battery as well. Further, the process of recovering valuable resources, which will be described below, is designed to mainly recover electrode foils (Al or Cu) used as a charge collector of the lithium-ion secondary battery, a transition metal (Ni, Mn, Co, or the like) used as a positive electrode material, and lithium present in the positive electrode material and a negative electrode material. Further, the process of recovering valuable resources, which will be described below, will be described citing an example in which the battery pack is heated in the aforementioned heat treatment at a temperature at which the organic electrolyte is discharged and the positive electrode material is not decomposed, namely, at a temperature equal to or higher than 150° C. and lower than 180° C.

As shown in FIG. 7, in step S10, the battery pack subjected to the aforementioned heating process and the aforementioned condensation process is subjected to a crushing treatment. As described above, since thermoplastic resin, which is a material constituting the battery pack, is thermally decomposed, the battery pack assumes a state that is significantly different from its original form. However, the electrolytic solution in the battery cells and the like have been discharged to the outside to ensure a safe state in which the battery function has been destroyed. Accordingly, in the crushing treatment, it is more preferable to directly supply the battery pack into a shredding machine (a large-size hammer mill or the like) and subject the battery pack to the crushing treatment than to cause an operator to manually dismantle the battery pack, from the standpoint of treatment time and safety. Further, prior to the crushing of the battery pack by the shredding machine or the like, a treatment of immersing the battery pack in water to discharge the battery cells, or the like may be carried out. It should be noted that as this shredding machine or the like, a product that is generally used in treating scrap vehicles and scrap home electric appliances can be used.

By subjecting the battery pack to the crushing treatment with the aid of the shredding machine, non-valuable resources such as resin and the like are discharged as shredder dust. On the other hand, out of the battery cells in the battery pack, an aluminum case as an armor of the battery cells and the like become metal shards with high specific gravity, and the electrode foils (including the positive electrode material and the negative electrode material as well) and the like become metal scraps with low specific gravity. In countries including Japan, shredded dust is sent to landfill disposal in a controlled manner according to the waste disposal law. Further, as a condition of landfill disposal, a controlled-type landfill disposal criterion needs to be satisfied.

Then in step S12, the aforementioned metal shards with high specific gravity and the metal scraps with low specific gravity are sorted out with the aid of wind power, and the metal shards with high specific gravity are recovered. It should be noted that the metal shards with high specific gravity may be recovered by being sorted out with the aid of magnetic power instead of being sorted out with the aid of wind power.

Then in step S14, the metal scraps with low specific gravity such as the electrode foils (including the positive electrode material and the negative electrode material as well) and the like are washed by water, so that the lithium in the negative electrode material and the lithium in the positive electrode material are changed into lithium hydroxide, and that the transition metal in the positive electrode material is changed into hydroxides. A reaction in the case where lithium nickel dioxide is used as the positive electrode material is shown below.

Lithium hydroxide easily dissolves into water and hence becomes an aqueous solution. Hydroxides of transition metals such as nickel hydroxide and the like hardly dissolve into water because of very low solubility in water, and become solid contents. It should be noted that the solubility of nickel hydroxide is 0.0013 g/100 cm$^3$.

Then in step S16, an aqueous solution of the aforementioned lithium hydroxide and the like is screened out from the solid contents such as nickel hydroxide and the like by a vibrating screen or the like. Then in step S18, carbon dioxide gas is introduced into the aqueous solution of lithium hydroxide to neutralize lithium hydroxide into lithium carbonate. This lithium carbonate is precipitated, filtered, and recovered.

Then in step S20, the solid contents of hydroxides and the like of transition metals, such as nickel hydroxide and the like, are supplied into a soaking bath, and an acid such as hydrochloric acid or the like is added to the solid contents to change the hydroxide of the transition metal into a water-soluble metal chloride. A solution of a metal chloride such as a nickel chloride or the like is extracted. A later-described step S30 proceeds where the solution of the metal chloride is recycled into products of a metal, nickel sulfate, and the like, for example, as a nickel material by an existing smelting process.

Further, when hydrochloric acid is added (step S20), a metal hydroxide such as unreacted nickel hydroxide or the like (the positive electrode material), a separator, and aluminum (the electrode foil) float up, and the negative electrode material (carbon) and copper (the electrode foil) sink down in the soaking bath. Therefore, these floating materials can be separated from these sinking materials. It should be noted that floating objects that have floated up in the soaking bath will be referred to hereinafter as floating electrode materials, and that sinking objects (deposit) that have sunk down in the soaking bath will be referred to hereinafter as sinking electrode materials. It should be noted that when sulfuric acid is added instead of hydrochloric acid in step S20, the metal hydroxide such as unreacted nickel hydroxide or the like, the separator, aluminum (the electrode foil), the negative electrode material (carbon), and copper (the electrode foil) all sink down. The reason for which the floating electrode materials can be separated from the sinking electrode materials through the addition of hydrochloric acid is considered to consist not only in the difference in specific gravity between copper and aluminum but also in that in the case where hydrochloric acid is added, the generation speed of hydrogen gas, which is generated in the process of fretting aluminum, is higher than in the case where sulfuric acid is added, and hence the apparent specific gravity of aluminum is lower than 1. In consequence, the addition of hydrochloric acid is preferable in that the added value as a recyclable material can be enhanced by raising the purity of copper during the subsequent recovery of copper. It should be noted that even in the case where sulfuric acid is added, valuable metals such as Ni and the like can be recovered in a subsequent process.

Then in step S22, the floating electrode materials that have separated from the soaking bath are supplied into a cleaning bath, hydrochloric acid is added to the floating electrode materials, and the floating electrode materials are stirred and cleaned. Thus, aluminum and the hydroxide of the transition metal such as nickel hydroxide or the like, which has adhered to the separator, are changed into water-soluble metal chlorides. Then in step S24, the solid contents such as aluminum, the separator and the like are screened out from a solution of a metal chloride such as a nickel chloride or the like by a vibrating screen or the like. The aluminum and separator thus screened out may be recovered as a recyclable material or scrapped. On the other hand, step S30 proceeds where the solution of the metal chloride such as the nickel chloride or the like is refined by an existing refinement process, and is recycled into products of a metal, nickel sulfate, and the like, for example, as a nickel material.

In step S26, the sinking electrode materials that have separated from the soaking bath are supplied into the cleaning bath in the same manner as described above, hydrochloric acid is added to the sinking electrode materials, and the sinking electrode materials are stirred and cleaned. Thus, the hydroxide of the transition metal such as nickel hydroxide or the like, which has adhered to copper, is changed into a water-soluble metal chloride. Then in step S28, the solid contents such as copper and the like are screened out from a solution of a metal chloride such as a nickel chloride or the like by a vibrating screen or the like. The copper thus screened out is recovered as a recyclable material. On the other hand, in the same manner as described above, step S30 proceeds where a solution of a metal chloride such as a nickel chloride or the like is refined by an existing refinement process and recycled into products of a metal, nickel sulfate, and the like, for example, as a nickel material.

So far, the process of recovering valuable resources from the battery pack that is heated at a temperature at which the organic electrolyte is discharged and the positive electrode material is not decomposed, namely, at a temperature equal to or higher than 150° C. and lower than 180° C. in the aforementioned heat treatment has been described. For example, however, in the case where valuable resources are recovered from the battery pack heated at a temperature equal to or higher than 180° C., which is a temperature at which lithium nickel dioxide and the like are decomposed, nickel has changed into nickel oxides. Therefore, even when these nickel oxides are cleaned by water in the aforementioned step S14, it is difficult to decompose them. In this case, valuable metals can be recovered by dissolving the metal scraps with low specific gravity, which have been sorted out through the sorting with the aid of wind power or the like in step S12, into an acid at high temperature and under high pressure.

What is claimed is:

1. A recycling method for a battery pack that includes an assembled battery composed of a plurality of electric cells that are connected in series to one another, comprising:
   supplying a vapor or an inert gas, which replaces a space in a heat treatment bath for heating the battery pack, into the heat treatment bath to heat the battery pack; and
   condensing thermolysis products discharged from the battery pack by heating the battery pack.

2. The recycling method according to claim 1, wherein the battery pack is heated to a temperature equal to or higher than 150° C. and lower than 180° C.

3. The recycling method according to claim 1, wherein the battery pack is heated to a temperature equal to or higher than 160° C.

4. The recycling method according to claim 1, further comprising heating the vapor before the vapor is supplied into the heat treatment bath, wherein
   the heated vapor is supplied into the heat treatment bath to heat the battery pack.

5. The recycling method according to claim 1, wherein the electric cells are nickel hydride secondary batteries or lithium-ion secondary batteries.

* * * * *